United States Patent
Tang et al.

(10) Patent No.: US 8,179,838 B2
(45) Date of Patent: May 15, 2012

(54) WI-FI ENABLED ROUTER HAVING UPLINK BANDWITH SHARING CAPABILITY

(75) Inventors: Yiming Tang, Singapore (SG); Qun Zeng, Singapore (SG); Keli Zhang, Singapore (SG); Yu Zhou, Singapore (SG)

(73) Assignee: Motorola Mobility, Inc., Libertyville, IL (US)

( * ) Notice: Subject to any disclaimer, the term of this patent is extended or adjusted under 35 U.S.C. 154(b) by 811 days.

(21) Appl. No.: 12/254,061

(22) Filed: Oct. 20, 2008

(65) Prior Publication Data

US 2010/0098034 A1  Apr. 22, 2010

(51) Int. Cl.
*H04W 4/00* (2009.01)

(52) U.S. Cl. .......................... 370/328; 370/401; 709/202

(58) Field of Classification Search ........................ None
See application file for complete search history.

(56) References Cited

U.S. PATENT DOCUMENTS

| | | | |
|---|---|---|---|
| 6,711,138 B1 | 3/2004 | Pai et al. | |
| 6,757,269 B2 | 6/2004 | Dorenbosch et al. | |
| 7,031,266 B1 | 4/2006 | Patel et al. | |
| 7,256,996 B2 | 8/2007 | Egbert et al. | |
| 7,385,960 B2 | 6/2008 | Bansal et al. | |
| 2005/0271020 A1 | 12/2005 | Thermond | |
| 2006/0233137 A1 | 10/2006 | Dantu et al. | |
| 2007/0105574 A1* | 5/2007 | Gupta et al. | 455/509 |
| 2007/0110017 A1 | 5/2007 | Fulknier et al. | |
| 2007/0286122 A1* | 12/2007 | Fonseca | 370/329 |
| 2009/0116511 A1* | 5/2009 | Anderson et al. | 370/468 |
| 2009/0191817 A1* | 7/2009 | Gupta et al. | 455/67.13 |

FOREIGN PATENT DOCUMENTS

WO  2005002136 A1  1/2005

* cited by examiner

*Primary Examiner* — Bob Phunkulh

(57) ABSTRACT

A method and apparatus is provided for forwarding data traffic to a broadband network. The method includes receiving at a local broadband wireless router data traffic to be forwarded to a broadband network and acquiring over a wireless communications link current bandwidth utilization rates for one or more neighboring broadband wireless routers. Based at least in part on the current bandwidth utilization rate of the local router and the current bandwidth utilization rate acquired from the one or more neighboring wireless routers, the data traffic is forwarded to the broadband network over a broadband interface of the local router or to a selected one of the neighboring routers over a wireless interface of the local router.

20 Claims, 4 Drawing Sheets

| DEVICE | BANDWIDTH UTILIZATION (%) |
|---|---|
| LOCAL ROUTER | 97 |
| NEIGHBORING ROUTER 1 | 10 |
| NEIGHBORING ROUTER 2 | 90 |
| NEIGHBORING ROUTER 3 | 30 |

WI-FI ENABLED ROUTER HAVING UPLINK BANDWITH SHARING CAPABILITY

FIELD OF THE INVENTION

The present invention relates generally to wireless communications and more particularly to a wireless router that processes traffic in a wireless local area network (WLAN).

BACKGROUND OF THE INVENTION

Communication technologies that link electronic devices in a networked fashion are well known. Examples of communication networks include wired packet data networks and wireless packet data networks. For instance, Wired Local Area Networks (wired LANs), e.g., Ethernets, are quite common and support communications between networked computers and other devices within a service area. Wired LANs also often link serviced devices to Wide Area Networks, the Internet and other broadband networks.

Wireless packet data networks include cellular telephone networks, wireless LANs (WLANs), and satellite communication networks, among others. Relatively common forms of WLANs are IEEE 802.11a networks, IEEE 802.11b networks, and IEEE 802.11g networks, referred to jointly as "IEEE 802.11 networks." In a typical IEEE 802.11 network, a wired backbone couples to a plurality of Wireless Access Points (WAPs), each of which supports wireless communications with computers and other wireless terminals that include compatible wireless interfaces within a service area. The wired backbone couples the WAPs of the IEEE 802.11 network to other networks, both wired and/or wireless, and allows serviced wireless terminals to communicate with devices external to the IEEE 802.11 network.

WLANs provide significant advantages when servicing mobile devices such as portable computers, portable data terminals, and other devices that are not typically stationary and cannot access a wired LAN connection. WLANs are often deployed inside structures such as homes, offices and public and commercial buildings for networking with client mobile computers and other client mobile electronic devices. However, WLANs provide relatively low data rate service as compared to wired LANs, e.g., IEEE 802.3 networks. Currently deployed wired LANs provide up to one Gigabit/second bandwidth and relatively soon, wired LANs will commonly provide up to 10 Gigabit/second bandwidths. However, because of their advantages in servicing portable devices, WLANs are often deployed so that they support wireless communications in a service area that overlays with the service area of a wired LAN. In such installations, devices that are primarily stationary, e.g., desktop computers, couple to the wired LAN while devices that are primarily mobile, e.g., laptop computers, couple to the WLAN. The laptop computer, however, may also have a wired LAN connection that it uses when docked to obtain relatively higher bandwidth service.

The WAPs generally include a wireless broadband router and a broadband modem. A router, regardless of whether it is wireless or wired, distinguishes data packets according to network protocols and forward traffic according to network-level addresses utilizing information that the routers exchange among themselves to find the best path between network segments. As the status of routers change in the network, the routers exchange information to reroute traffic around congested or failed routers or to route traffic to a newly activated router. The wireless router also allows connectivity between mobile devices and the WLAN or between one wireless router and another wireless router. The broadband modem allows digital data traffic received from the router to be modulated into an analog signal suitable for transmission to a broadband network over a transmission media such as telephone lines, cable wires, optical fibers, or wireless radio frequencies. The broadband modem also re-converts analog signals received from the broadband network over the transmission medium back into digital data packets so that they can be forwarded to the router.

Regardless of the bandwidth that is available over a LAN or a WLAN, the bandwidth that is available from either type of network to and from a broadband network (e.g., the Internet) is normally established by a service provider such as an Internet Service Provider (ISP). Typically, the available uplink bandwidth that is established from the LAN or WLAN and the broadband network is less than the downlink bandwidth from the broadband network and the LAN or WLAN, particularly in the case where the broadband network is a DLS network. Significantly, the uplink bandwidth to the broadband network is often substantially less than the bandwidth available over an 802.11 WLAN network.

SUMMARY

In accordance with the present invention, a method is provided for forwarding data traffic to a broadband network. The method includes receiving at a local broadband wireless router data traffic to be forwarded to a broadband network and acquiring over a wireless communications link current bandwidth utilization rates for one or more neighboring broadband wireless routers. Based at least in part on the current bandwidth utilization rate of the local router and the current bandwidth utilization rate acquired from the one or more neighboring wireless routers, the data traffic is forwarded to the broadband network over a broadband interface of the local router or to a selected one of the neighboring routers over a wireless interface of the local router.

In accordance with another aspect of the invention, the local router registers with its broadband service provider in order to participate in an uplink bandwidth sharing service and queries the broadband service provider for a password needed to acquire the bandwidth utilization rate for each of the neighboring routers.

In accordance with another aspect of the invention, the current bandwidth utilization rates is acquired by polling a plurality of neighboring wireless routers for their respective bandwidth utilization rates.

In accordance with another aspect of the invention, polling the plurality of neighboring wireless routers is performed in a recurring sequential manner.

In accordance with another aspect of the invention, polling the plurality of neighboring wireless routers is performed upon user request.

In accordance with another aspect of the invention, the data traffic is forwarded over the local broadband interface or the local wireless interface based on the current bandwidth utilization rates and a level of service associated with the data traffic.

In accordance with another aspect of the invention, a broadband wireless router includes a broadband interface for communicating with a broadband network via a broadband modem and a wireless interface for transmitting traffic to and receiving traffic from wireless terminals. The broadband wireless router also includes a routing engine for routing the traffic between the wireless terminals and remote terminals in communication with the broadband network an uplink traffic controller. The uplink traffic controller selectively causes traffic to be routed in accordance with at least one predetermined criterion to the broadband network through either the broadband interface or a second broadband wireless router that is accessed through the wireless interface.

In accordance with another aspect of the invention, the uplink traffic controller includes a bandwidth monitoring module for acquiring over the wireless interface current bandwidth utilization rates for one or more neighboring broadband wireless routers from which the second broadband wireless router will be selected.

In accordance with another aspect of the invention, the bandwidth monitoring module is configured to poll the neighboring broadband wireless routers in order to acquire their respective current bandwidth utilization rates.

In accordance with another aspect of the invention, the predetermined criterion includes a local current bandwidth utilization rate with respect to traffic routed through the broadband interface relative to the current bandwidth utilization rates for the neighboring routers.

In accordance with another aspect of the invention, the uplink traffic controller selects as the second router a neighboring router having a lowest current bandwidth utilization rate of all of the neighboring routers.

DETAILED DESCRIPTION

As previously mentioned, many types of broadband networks, particularly DSL networks, assign each subscriber a fixed amount of uplink and downlink bandwidth. The uplink bandwidth is typically much less than the downlink bandwidth. At the same time, the available bandwidth is wasted if the subscriber is not actively accessing the network. As detailed below, a subscriber can increase his or her effective available uplink bandwidth by accessing any excess uplink bandwidth that is not being used by another nearby router. This can be accomplished in an environment where there are multiple wireless routers available that overlap in a service area. Wi-Fi routers, for instance, currently have service areas that extend upwards of 100 meters. Thus, in an environment such as an apartment or office building, a dormitory, or even in a residential neighborhood in which individual residences are in relatively close proximity, there may often be a number of wireless routers that overlap in service area. When the uplink bandwidth available through a subscriber's own local wireless router is insufficient, the wireless router can poll its neighboring wireless routers over the wireless interface to find one that currently has unused or excess uplink bandwidth. If such a neighboring router is discovered, the subscriber's local router can forward traffic to the neighboring router over the wireless interface. The neighboring router, in turn, will then use its excess uplink bandwidth to forward the traffic to the broadband network. This can be an efficient mechanism for using idle uplink bandwidth, particularly since the uplink bandwidth to the broadband network is often significantly less than the bandwidth that is available when one wireless router communicates with another wireless router over a WLAN such as an IEEE 802.11 WLAN.

Figure 1:
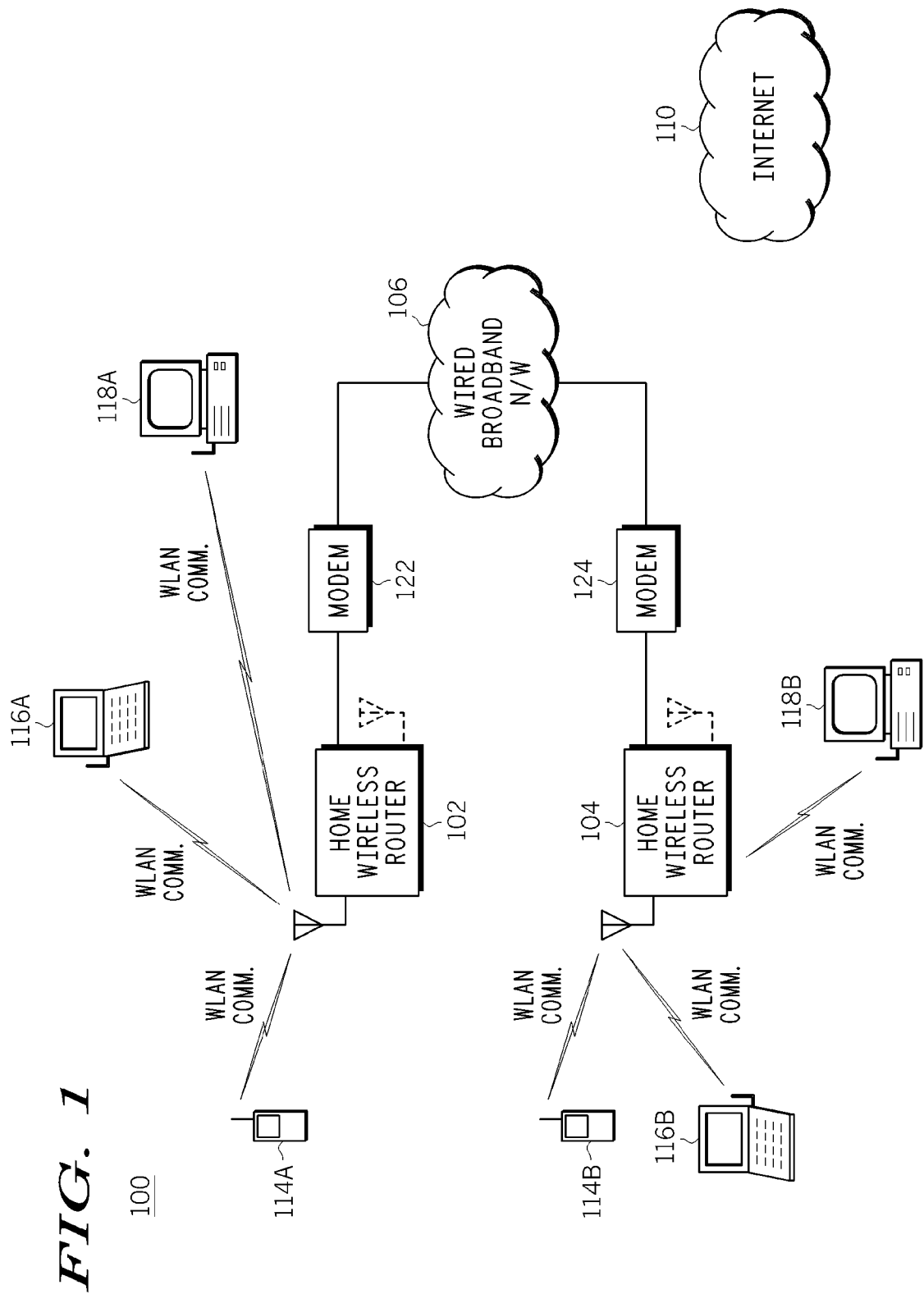
FIG. 1 shows an illustrative communication system that includes a wireless local area network (WLAN).

An illustrative communication system 100 is shown in FIG. 1. The communication system 100 supports Wireless Local Area Network (WLAN) communications within one or more WLAN service areas. In this example two broadband wireless routers 102 and 104 are provided, each of which supplies WLAN communications for a different WLAN service area. In particular, broadband wireless router 102 supports WLAN communications within its service area, which is shown to include wireless terminal 114A, wireless terminal 116A (laptop computer), and wireless terminal 118B (desktop computer). Likewise, broadband wireless router 104 supports WLAN communications within its respective WLAN service area, which is shown to include wireless terminals 114B, 116B, and 118B. Of course, the numbers and types of wireless terminals that may be supported by the broadband routers 102 and 104 vary from installation-to-installation. Broadband routers are also sometimes referred to as residential gateways. As previously mentioned, the service areas of wireless routers 102 and 104 will overlap if they are in close enough proximity to one another. It should be noted that one or more of the wireless terminals, such as desktop computer 118B, for instance, optionally may also be in communication with the wireless routers over a wired connection as well as a wireless connection. In addition, other terminals (not shown) may only be connected to the wireless routers over a wired connection.

The broadband routers 102 and 104 establish communication between the wireless terminals in their respective WLAN service areas and a broadband network 106 using a broadband modems 122 and 124, respectively. The broadband network 106 may be an xDSL (e.g., ADSL, ADLS2, ADSL2+, VDSL, and VDSL2). Of course, other broadband access networks, including cable data networks such as an all-coaxial or a hybrid-fiber/coax (HFC) network may also be employed. Broadband network 106 can provide communications services over Internet 110.

Figures 2, 3:
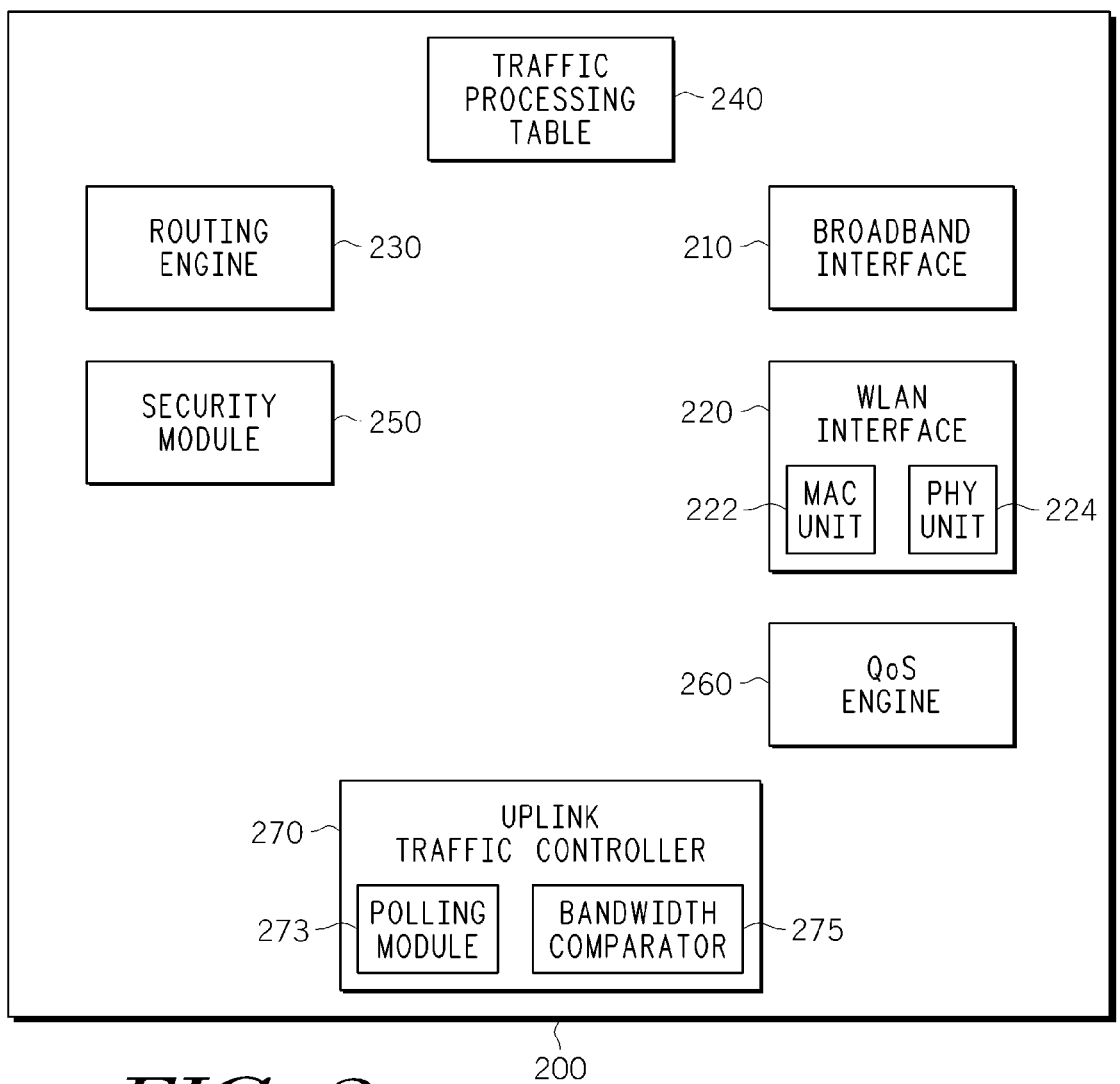
FIG. 2 shows one example of a broadband wireless router.
FIG. 3 shows one example of a bandwidth utilization table.

FIG. 2 shows one example of a broadband wireless router 200 such as broadband wireless routers 102 and 104 shown in FIG. 1. The broadband router 200 includes broadband interface 210, WLAN interface 220, QoS engine 260, uplink traffic controller 270, security module 250, routing engine 230 and traffic processing table 240.

The broadband interface 210 communicates with a broadband modem (e.g., modems 122 and 124 in FIG. 1) such as a cable modem in the case of a cable network or a DSL modem in the case of a DSL network and thus provides a direct local link to the broadband network (e.g., broadband network 106 in FIG. 1). A WLAN interface 220 supports WLAN communications with the wireless terminals in accordance with a standardized communication protocol. The WLAN communication protocol may be one or more of IEEE 802.11 (e.g., IEEE 802.11a, IEEE 802.11b, IEEE 802.11g, IEEE 802.11n), Bluetooth, IEEE 802.15, IEEE 802.16 (WiMAX), HomeRF, Ultra Wide Band, Zigbee, and/or another WLAN communication standard or protocol. The wireless interface may operate in various bands including, for instance, 900 MHz, 2.4 GHz, 5 GHz, 23 GHz, VHF, and UHF and may further incorporate spread spectrum techniques.

Among other functions it may perform, the WLAN interface 220 segments IP packets received from the broadband network 106 into radio frames for transmission to the wireless terminals and reassembles radio frames received from the wireless terminals into packets for transmission over the broadband network. To accomplish this, the WLAN interface 220 will generally include a media access control layer (MAC) unit 222 and a PHY unit 224. If the WLAN interface operates in accordance with IEEE 802.11, for instance, the MAC unit 222 appends a MAC header and a frame check sequence (FCS) trailer to a MAC service data unit (MSDU) to form a MAC layer protocol data unit (MPDU). The PHY unit 224 receives the MPDU as a physical layer service data unit (PSDU) and attaches a physical layer convergence procedure (PLCP) header, a PLCP preamble, and tail and pad bits to form a physical layer protocol data unit (PPDU), which can be transmitted over a wireless channel. Other wireless protocols will typically use a MAC unit and a PHY unit in a similar manner.

The broadband router 200 also includes a routing engine 230 having a processor for implementing routing algorithms stored in a memory. The routing engine may also support other well-known router functions and functional elements such as an IP/Ethernet or PPPoE connection, WAN port, MAC adjustment, DNS proxy, Dynamic DNS, DHCP server, DHCP/BOOTP client, NAT/NAPT, virtual server, and DMZ hosting. A traffic processing table 240 includes routing tables and forwarding tables that are employed by the routing algorithms in the routing engine 230.

A security module 250 provides network security mechanisms on both the broadband network side and the WLAN side. On the broadband network side, such security mechanisms may include layer 2/3/4 access control, firewall, packet filtering, DoS prevention, and intrusion detection. On the WLAN side, various security options may be provided such as WEP with 64/128-bit of key, WEP plus 802.1x/RADIUS authentication, WPA with 802.1x/RADIUS authentication & key management, and WPA with preshared key mode.

The QoS engine 260 manages transmission resources within the broadband router 200. The QoS engine 260 may include a dynamic flow manager, a performance monitor, a dynamic bandwidth estimator and a multiple dimension resource queuing system for processing and handling traffic. The dynamic bandwidth estimator determines the local uplink and downlink bandwidth usage between the router 200 and the broadband network 106 at any given time.

In order to facilitate uplink bandwidth sharing with neighboring wireless routers, the broadband wireless router 200 includes an uplink traffic controller 270. In this example the uplink traffic controller 270 includes a polling module 273 and a bandwidth comparator 275. The polling module 273 polls, queries or otherwise scans neighboring routers via the WLAN interface 220 to obtain their respective bandwidth utilization rates, which reflects the percentage of total available bandwidth currently being used. The polling module 273 may poll neighboring routers on some periodic basis, upon user request, whenever the LOCAL uplink utilization rate exceeds a predetermined threshold, or any combination thereof If the polling module polls on a periodic basis, the period that is employed may be configured by the end user or the service provider. The polling module 273 also responds to requests received from neighboring routers for its own LOCAL bandwidth utilization rate, which is available from the dynamic bandwidth estimator associated with QOS module 260. While the polling module 273 has just been described in terms of pull technology in which the initial request for the bandwidth utilization rate originates with the client (i.e., the local router), the polling module 273 may also use a push technology to push or transfer this information to the local router from the neighboring routers.

The bandwidth comparator 275 associated with uplink traffic controller 270 is used to compare the current local bandwidth utilization rate of the local router with the bandwidth utilization rate of the neighboring routers. Based on the comparison, and possibly other factors that will be discussed below, the uplink traffic controller 270 will decide whether to transmit traffic to the broadband network over its own local broadband interface 210 or over a wireless link to one of the neighboring routers, which in turn will then transmit the packet(s) over its own broadband interface.

The routing decision performed by the local router to determine if a packet is to be transmitted to the broadband network by the local router or a neighboring router may take into account any of a wide variety of factors. For example, in some implementations, the routing decision may be based on the following three criteria. First, all real-time traffic (e.g., voice, video) in this example is always transmitted over the local broadband interface. In this way latency problems caused by forwarding such traffic to a neighboring router can be avoided. Second, for all non-real-time traffic (e.g., best-effort traffic), the local router will route the traffic to a neighboring router when the local bandwidth utilization rate exceeds a certain level (e.g., 95% of capacity) and the neighboring router has a bandwidth utilization rate below a certain level (e.g., 50%). If more than one neighboring router satisfies this second criterion, then the neighboring router with the lowest bandwidth utilization rate may be employed. Third, the neighboring router's bandwidth is always guaranteed to be available for its own subscriber's traffic. That is, this third and final criterion ensures that each router gives priority to its own local traffic over any traffic received from a neighboring router.

FIG. 3 shows one example of a bandwidth utilization table that has been prepared by the uplink traffic controller 270. In this example the local router's current uplink bandwidth utilization rate is 97% of capacity. The local router has discovered and polled three neighboring routers, denoted routers 1, 2 and 3. Router 1 has a bandwidth utilization rate of 10%, router 2 has a bandwidth utilization rate of 90%, and router 3 has a bandwidth utilization rate of 30%. If the local router were to make its routing decision based on the three criteria set forth above, then any additional best-effort traffic it needs to route to the broadband network will be routed through router 1. Of course, additional factors may be taken into account when selecting an appropriate neighboring router to which traffic will be forwarded. For instance, the strength of the wireless signals that the local router receives from the neighboring routers may be taken into account. In particular, in some cases only neighboring routers with a signal strength above some threshold value will be considered as candidates, regardless of their bandwidth utilization rate.

Figure 4:
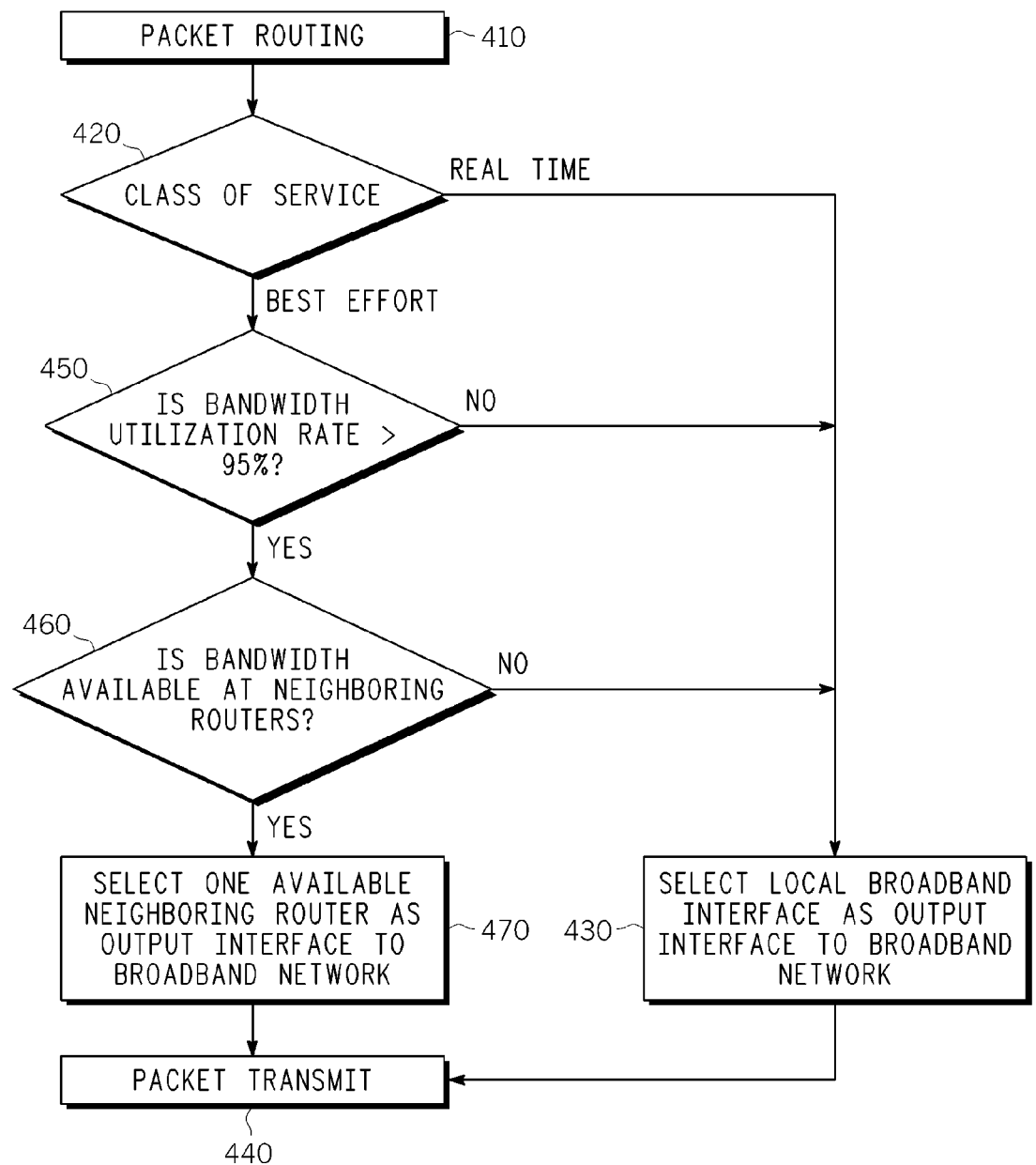
FIG. 4 is a flowchart depicting one example of the uplink routing decision process that is performed by a local wireless router.

FIG. 4 is one example of a flowchart depicting the uplink routing decision process that is performed by a local router. The process begins in step 410 when the local router receives a packet that is to be delivered to the broadband network. At decision step 420 the local router examines the packet's class of service to determine if the packet is designated as best effort traffic or real-time traffic. If the packet is real time traffic, the process proceeds to step 430 where the local router selects its own broadband interface through which the packet will be routed in step 440. On the other hand, if at decision step 420 the local router determines that the packet is designated as best effort traffic, the process proceeds to decision step 450 where the local router determines if its current local bandwidth utilization rate is greater than some threshold value, which in this example is 95% of capacity. If its current local bandwidth utilization rate is below the threshold, then the process continues to step 430, where the local router once again selects its own broadband interface through which the packet will be routed in step 440. If however the current local bandwidth utilization rate is above the threshold, then the process continues to step 460 where the local router examines the bandwidth utilization rate of the neighboring routers to determine if any of them have available bandwidth. If no such bandwidth is available, then the process yet again proceeds to steps 430 and 440 where packet is routed through the local broadband interface. However, if neighboring routers do have available uplink bandwidth then the process proceeds from decision step 460 to step 470, at which one of neighboring routers is selected in accordance with pre-established criteria. For instance, using the bandwidth utilization table shown in FIG. 3 as an example, the local router may select router 1 since it has the lowest bandwidth utilization rate. Finally, at step 440 the packet is transmitted to router 1 so that it can be forwarded to the broadband network over the broadband interface of router 1. It should be noted that since in this example the routing decision is made on a packet by packet basis, a single message or file may be transmitted to the broadband network over two or more different broadband interfaces associated with different wireless routers.

Figure 5:
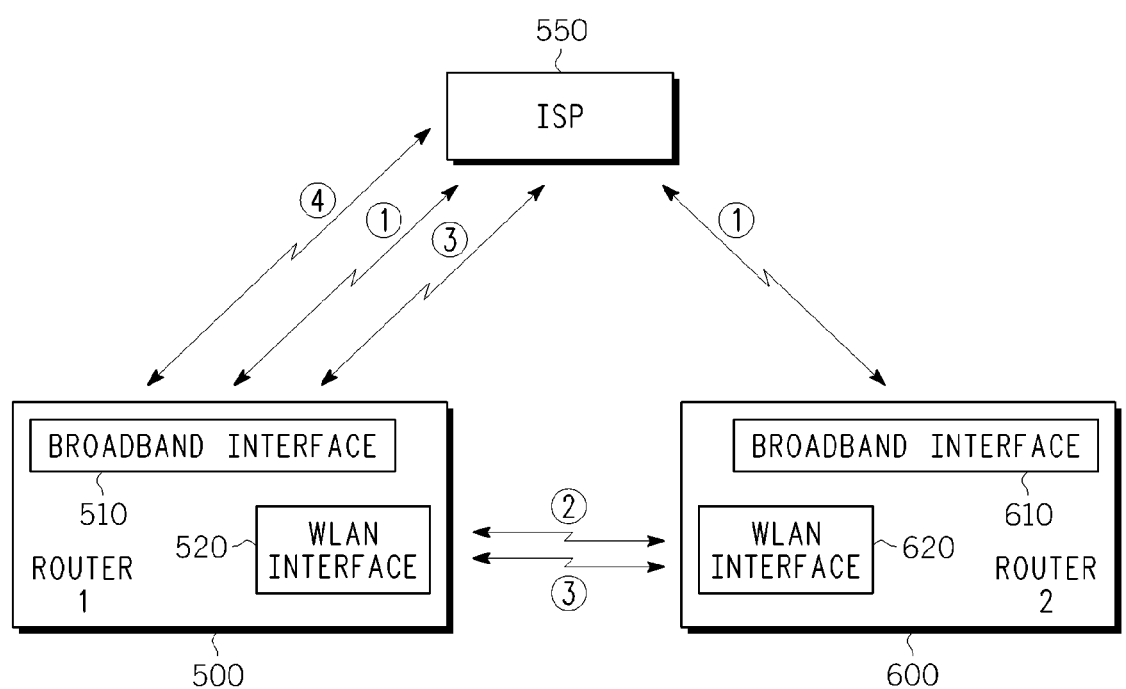
FIG. 5 is a message flow diagram illustrating the manner in which two routers register with their common ISP and share the uplink bandwidth.

Security concerns will often require that each wireless router only participates in uplink bandwidth sharing when this service is desired by the subscriber. This can be accomplished by having the subscriber register its router with his or her broadband service provider (e.g., an Internet Service Provider or ISP). In the simplest case, both the local router and the neighboring router have the same service provider. FIG. 5 is a message flow diagram illustrating the manner in which two routers 500 and 600 register with their common ISP and router 500 establishes communication with router 600 for the purpose of sharing the uplink bandwidth of router 600.

As indicated by arrows 1, routers 500 and 600 register for the uplink bandwidth sharing service offered by ISP 550 via their respective broadband interfaces 510 and 610. At some later time when router 500 desires to query neighboring routers for its current bandwidth utilization rate, router 500 begins a discovery process to identify its neighboring routers. This can be accomplished by receiving over WLAN 520 an identifier that is transmitted by the WLAN interface 620 of router 600, as indicated by arrow 2. In implementations that employ IEEE 802.11 interfaces, the identifier may be the Service Set Identifier (SSID) of the router 600, which is normally broadcast by routers in a beacon mode so that they can be identified by wireless devices (e.g., laptops, PDAs) that which to attach to them. Under the direction of its polling module, router 500 then sends a query to the ISP 550 asking for the password of router 600, as indicated by arrow 3. The query will include the identifier (e.g., the SSID) of router 600. Assuming both routers 500 and 600 have properly registered for the uplink bandwidth sharing service, the ISP 550 returns the password to router 500 (indicated by arrow 4) and router 500, in turn, forwards the password to router 600 over its WLAN interface 520 (indicated by arrow 5). At this point routers 500 and 600 have established communication with one another and router 500 can query router 600 for its bandwidth utilization rate and, if desired, subsequently forward traffic to router 600 for transmission to the broadband network.

If the local router and the neighboring router have different service providers, the local router will query its local service provider for the password of the neighboring router, similar to message flow indicted by arrow 3 in FIG. 5. The local service provider, in turn, will contact the service provider of the neighboring router to acquire its password. Once the local service provider has received the password of the neighboring router it will forward the password to the local router. The remainder of the process is otherwise largely the same as depicted in FIG. 5. The different service providers will generally need to have an agreement in place in order to implement this process in which the passwords of registered wireless routers are shared between them. The terms of such an agreement may be incorporated in a Service Level Agreement (SLA), which is a type of contract service providers often execute to specify the levels of availability, serviceability, performance, operation, or other attributes of the services that they will provide to one another.

The steps of the processes described above, including but not limited to those performed by the broadband wireless router, may be implemented in a general, multi-purpose or single purpose processor. Such a processor will execute instructions, either at the assembly, compiled or machine-level, to perform that process. Those instructions can be written by one of ordinary skill in the art following the description provided herein and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), and/or packetized or non-packetized wireline or wireless transmission signals.

A broadband wireless router has been described that can utilize excess uplink bandwidth that is not being used by one or more neighboring broadband wireless routers. In this way the uplink bandwidth of the broadband wireless router can be effectively increased.

The invention claimed is:

1. At least one non-transitory computer-readable medium encoded with instructions which, when executed by a processor, performs a method including:
   receiving at a local broadband wireless router data traffic to be forwarded to a broadband network;
   acquiring over a wireless communications link current bandwidth utilization rates for one or more neighboring broadband wireless routers;
   based at least in part on the current bandwidth utilization rate of the local router and the current bandwidth utilization rate acquired from the one or more neighboring wireless routers, forwarding the data traffic to the broadband network over a broadband interface of the local router or forwarding the data traffic to a selected one of the neighboring routers over a wireless interface of the local router;
   registering the local router with its broadband service provider in order to participate in an uplink bandwidth sharing service; and
   querying the broadband service provider for a password needed to acquire the bandwidth utilization rate for each of the neighboring routers.

2. The at least one non-transitory computer-readable medium of claim 1 wherein acquiring the current bandwidth utilization rates further comprises polling a plurality of neighboring wireless routers for their respective bandwidth utilization rates.

3. The at least one non-transitory computer-readable medium of claim 2 wherein polling the plurality of neighboring wireless routers is performed in a recurring sequential manner.

4. The at least one non-transitory computer-readable medium of claim 2 wherein polling the plurality of neighboring wireless routers is performed upon user request.

5. The at least one non-transitory computer-readable medium of claim 1 further comprising:

forwarding the data traffic over the local broadband interface or the local wireless interface based on the current bandwidth utilization rates and a level of service associated with the data traffic.

6. The at least one non-transitory computer-readable medium of claim 5 wherein the data traffic includes real-time and non-real-time data traffic, and further comprising forwarding the real-time traffic to the broadband network over the local broadband interface and forwarding the non-real-time traffic in accordance with based at least in part on the current bandwidth utilization rate of the local router and the current bandwidth utilization rate acquired from the one or more neighboring wireless routers, forwarding the data traffic to the broadband network over the broadband interface of the local router or forwarding the data traffic to the selected one of the neighboring routers over the wireless interface of the local router.

7. A broadband wireless router, comprising:
a broadband interface for communicating with a broadband network via a broadband modem;
a wireless interface for transmitting traffic to and receiving traffic from wireless terminals;
a routing engine for routing the traffic between the wireless terminals and remote terminals in communication with the broadband network;
an uplink traffic controller for selectively causing traffic to be routed in accordance with at least one predetermined criterion to the broadband network through either the broadband interface or a second broadband wireless router that is accessed through the wireless interface, the uplink traffic controller including a bandwidth monitoring module for acquiring over the wireless interface current bandwidth utilization rates for one or more neighboring broadband wireless routers from which the second broadband wireless router will be selected and configured to query a broadband service provider with which it is registered for a password needed to acquire the bandwidth utilization rates from each of the neighboring routers. rate acquired from the one or more neighboring wireless routers, forwarding the data traffic to the broadband network over the broadband interface of the local router or forwarding the data traffic to the selected one of the neighboring routers over the wireless interface of the local router.

8. The broadband wireless router of claim 7 wherein the bandwidth monitoring module is configured to poll the neighboring broadband wireless routers in order to acquire their respective current bandwidth utilization rates.

9. The broadband wireless router of claim 7 wherein the at least one predetermined criterion includes a local current bandwidth utilization rate with respect to traffic routed through the broadband interface relative to the current bandwidth utilization rates for the neighboring routers.

10. The broadband wireless router of claim 9 wherein the at least one predetermined criterion further includes signal strengths associated with signals received from the neighboring routers.

11. The broadband wireless router of claim 7 wherein the uplink traffic controller selects as the second router a neighboring router having a lowest current bandwidth utilization rate of all of the neighboring routers.

12. The broadband wireless router of claim 11 wherein the uplink traffic controller causes the traffic to be routed to the second router when a local current bandwidth utilization rate with respect to traffic routed through the broadband interface is above a first threshold value and the second router has a current bandwidth utilization rate below a second threshold value.

13. The broadband wireless router of claim 7 wherein the query includes an identifier for each of the neighboring routers.

14. The broadband wireless router of claim 13 wherein the identifier is a Service Set Identifier (SSID).

15. The broadband wireless router of claim 7 wherein the traffic that is selectively routed by the uplink traffic controller is non real-time traffic.

16. A method for forwarding data traffic to a broadband network, comprising:
receiving at a local broadband wireless router data traffic to be forwarded to a broadband network;
acquiring over a wireless communications link current bandwidth utilization rates for one or more neighboring broadband wireless routers;
based at least in part on the current bandwidth utilization rate of the local router and the current bandwidth utilization rate acquired from the one or more neighboring wireless routers, forwarding the data traffic to the broadband network over a broadband interface of the local router or forwarding the data traffic to a selected one of the neighboring routers over a wireless interface of the local router;
registering the local router with its broadband service provider in order to participate in an uplink bandwidth sharing service; and
querying the broadband service provider for a password needed to acquire the bandwidth utilization rate for each of the neighboring routers.

17. The method of claim 16 wherein acquiring the current bandwidth utilization rates further comprises polling a plurality of neighboring wireless routers for their respective bandwidth utilization rates.

18. The method of claim 17 wherein polling the plurality of neighboring wireless routers is performed in a recurring sequential manner.

19. The method of claim 17 wherein polling the plurality of neighboring wireless routers is performed upon user request.

20. The method of claim 16 further comprising forwarding the data traffic over the local broadband interface or the local wireless interface based on the current bandwidth utilization rates and a level of service associated with the data traffic.

* * * * *